Aug. 7, 1928.                 W. A. POWNALL                    1,679,373
                          FLUID TREATING APPARATUS
                          Filed Jan. 11, 1923            3 Sheets-Sheet 1
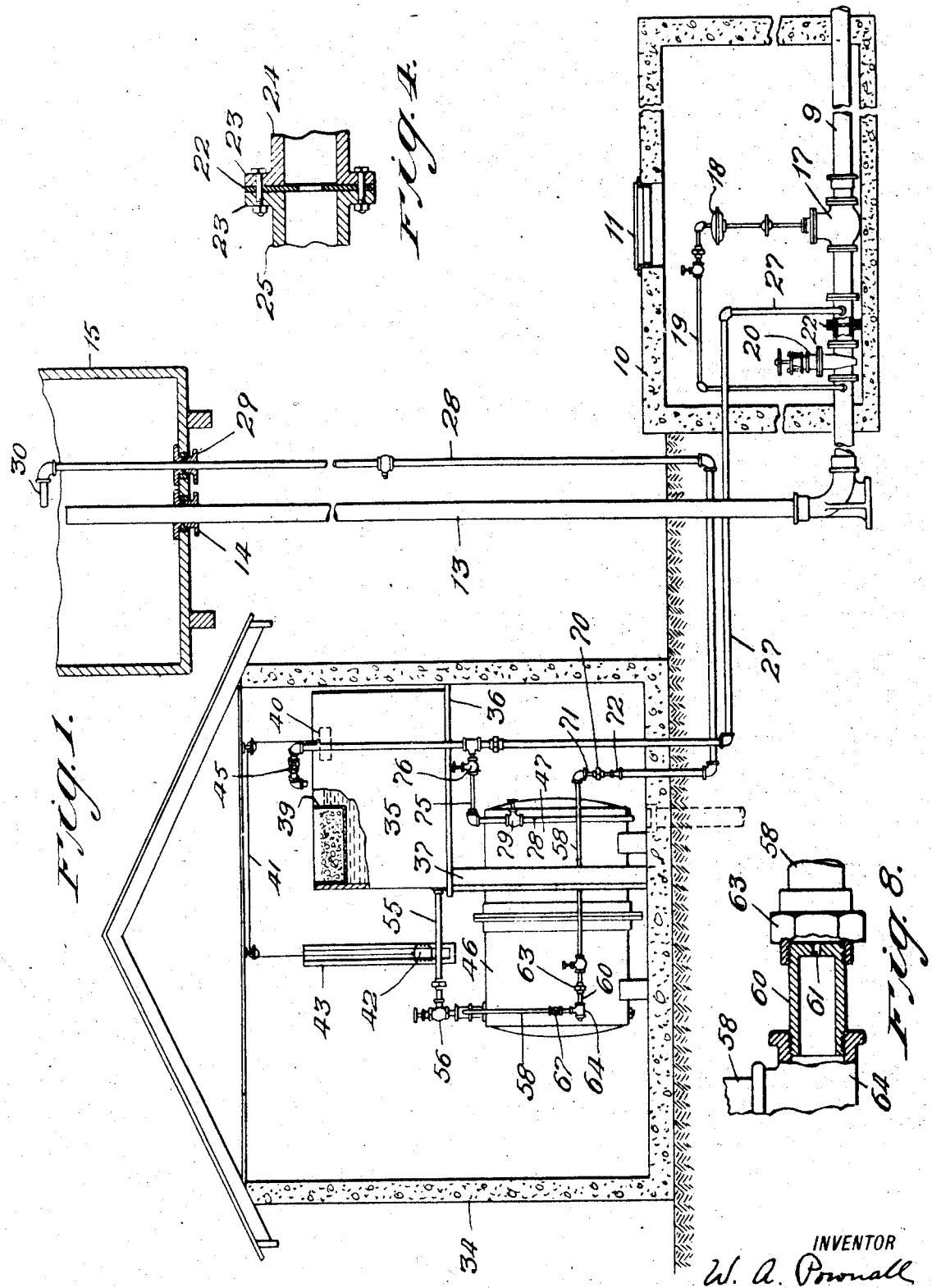
INVENTOR
W. A. Pownall
BY
Moss, Hammond, Moss & Trotter
ATTORNEYS

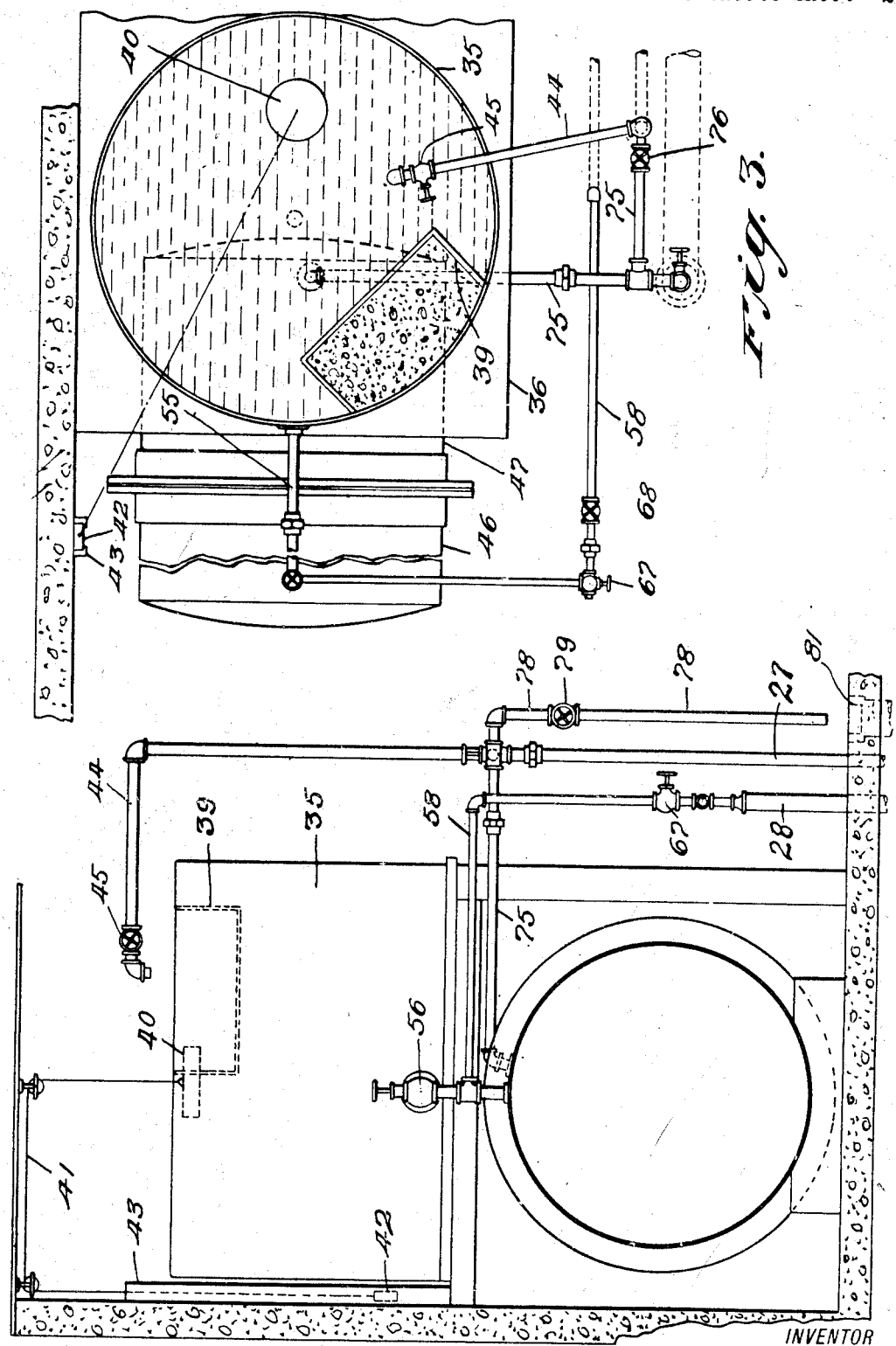

Aug. 7, 1928.
W. A. POWNALL
1,679,373
FLUID TREATING APPARATUS
Filed Jan. 11, 1923  3 Sheets-Sheet 3
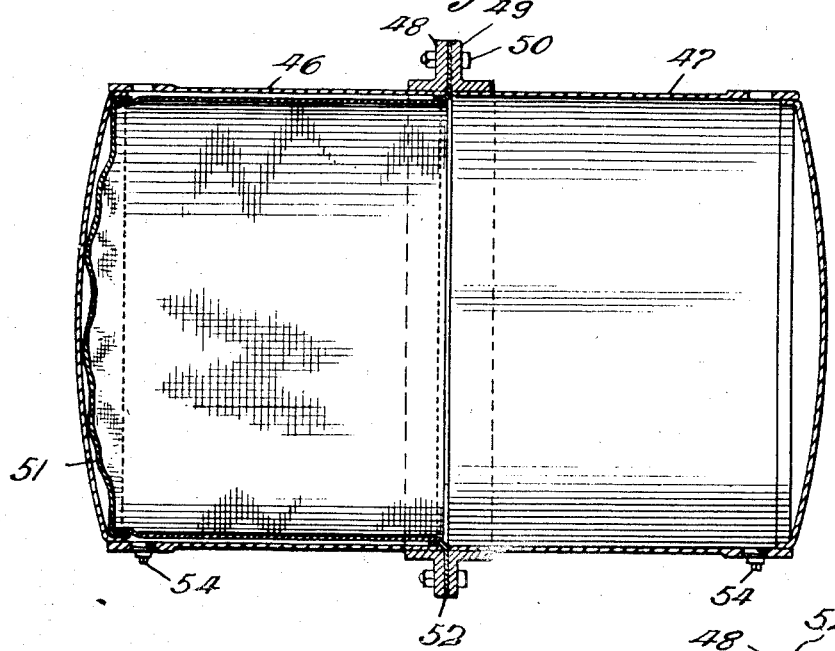
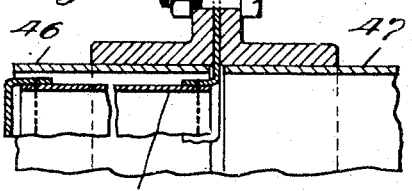
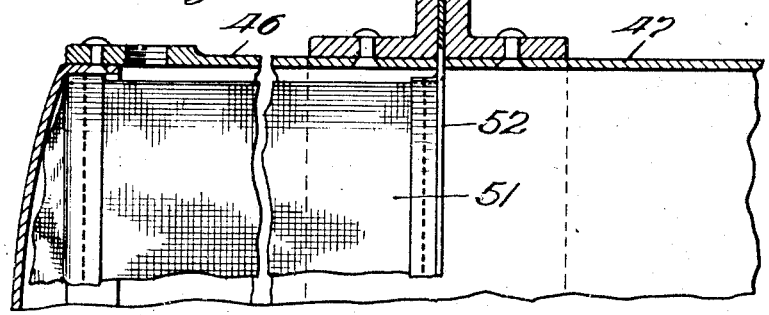

Patented Aug. 7, 1928.

1,679,373

UNITED STATES PATENT OFFICE.

WILLIAM A. POWNALL, OF DECATUR, ILLINOIS.

FLUID-TREATING APPARATUS.

Application filed January 11, 1923. Serial No. 611,999.

In the purification of water and other fluids, it frequently is desirable and necessary to treat them with a reagent for the purpose of counter-acting or causing to settle an impurity carried by the water either in solution or suspension.

The present invention relates to an apparatus for automatically introducing a treating substance into the fluid to be treated, said apparatus being particularly adapted for use in treating hard, muddy or otherwise impure waters to fit them for use in steam boilers. For waters in which foreign matter is carried in suspension, ordinary lime, if introduced in proper quantities, in solution, is frequently found to give satisfactory results; or for softening hard waters, the injection of a solution of soda ash, barium hydrate or any suitable chemical may be found beneficial, the particular reagent used depending upon the nature of the impurity to be removed.

The present invention may be considered as an improvement upon the invention described in U. S. Patent No. 1,048,833, dated December 31, 1912, and issued to Jay Russell Hickox and myself as joint inventors. In the apparatus described in that patent, there is provided a receptacle for holding the lime or other treating material, and this receptacle is connected in a by-pass thru which a part of the main water supply is diverted, whereby the treating material is dissolved and is carried into the main water channel where it mixes with the main body of the water stream. With this form of apparatus, it is obvious that with certain salts of varying solubilities the treating solution passing from the treating tank into the water main is not uniform in strength but becomes weaker as the treating material is dissolved and used up. Objectionable lack of uniformity may thus result from the treatment of water by the apparatus described in the aforesaid patent.

One of the objects of the present invention is to overcome the difficulty above mentioned, and provide apparatus which will function automatically and which will at all times feed into the fluid to be treated a treating solution of definite strength in quantities substantially proportioned to the amount of fluid to be treated. Generally speaking, this is accomplished by providing the inside of the treating tank with a movable partition which will at all times separate the treating solution and the water drawn from the main and used for impelling the treating solution into the water supply, whereby the weakening of the treating solution by the water used for impelling is prevented, and the proportioning of the amount of treating solution by using constrictions of predetermined sizes in the pipe lines carrying the fluid to be treated and the treating solution. Other objects of the present invention are to improve the apparatus in certain other respects which will be hereinafter apparent.

For the purpose of illustration and explanation, I have shown in the drawing forming part of this specification, and will hereafter describe in detail, a specific embodiment of invention designed as a treating plant for a locomotive water station; but it is obvious that my invention is capable of a great variety of modifications, and may be put to other uses.

Referring to the drawings, Figure 1 is a side elevation, partly in section, of apparatus embodying the invention; Figures 2 and 3 are, respectively, an end elevation and a plan view of a portion of the apparatus, including particularly the mixing vat and the solution tank; Figure 4 is a sectional elevation of a constriction introduced into the supply main; Figure 5 is a sectional longitudinal elevation of the treating tank; Figures 6 and 7 are fragmentary sectional elevations of portions of the treating tank; and Figure 8 is a fragmentary sectional elevation of a constriction introduced into the pipe thru which the solution passes to the settling tank. Like parts are referred to throughout this specification and in the drawings by the same reference characters.

Referring to the drawings, a source of fluid supply under pressure is indicated by the pipe 9 which extends from a concrete-lined pit 10 having a man-hole provided with a cover 11. Connected to the pipe 9, thru valves and a constriction hereinafter described, is a supply pipe 13 which passes thru a stuffing box 14 into the settling tank 15 in which the water is to be treated and preferably stored awaiting consumption. In order to maintain the water in the settling tank 15 at a certain level, there is preferably provided between the pipes 9 and 13, a valve 17 which may be of a well-known type which is caused to open and close in response to variations in the head of water above said valve in the pipe 13 and the tank 15, the pressure due to this head being transmitted to the operating means 18 of the valve thru a pipe 19 connecting said operating means with the pipe 13. As shown, there is also provided between the valve 17 and the pipe 13 a manually controlled valve 20 by which the supply of water to the tank 15 may be shut off. There is also provided, preferably between the valve 17 and the valve 20, a constriction which may be in the form of a thin sheet 22 of metal bolted between flanges 23 on pipe section 24 and 25, as shown in Figures 1 and 4. A pipe 27, connected to the pipe section 24 in advance of the constriction just mentioned, serves to carry water from the main to the apparatus in which the treating solution is mixed, and by which the treating solution is introduced into the settling tank 15. The treating solution is carried from this apparatus thru a pipe 28 passing thru a gland 29 in the bottom of the tank 15, said pipe 28 being provided at its top with a nozzle 30 which directs the treating solution into the stream passing into the settling tank from supply pipe 13.

The apparatus in which the treating solution is mixed and by which it is injected into the second tank 15 will now be described. This apparatus is shown as housed in a building 34. The mixing vat in which the soda ash or other treating substance is mixed with water is indicated at 35 as mounted on a suitable platform 36 supported by uprights 37. As shown, this vat 35 is provided at one side with a wire basket 39 adapted to hold the substance which is to be mixed with or dissolved in the water in the tank 35 to make the treating solution. There is also indicated in the drawings, a level indicator for the vat 35 of a conventional form characterized by a float 40, connected by a chain or cord 41 which passes over the pulleys, with an indicating member 42 which cooperates with a fixed guide and scale 43. Water may be supplied to the mixing vat thru the pipe 44 provided with a valve 45 and connected to the pipe 27.

Below the mixing vat 35, is a solution tank which is characterized by the fact that it is provided on its inside with a movable partition. As shown, the solution tank is cylindrical in form and consists of halves 46 and 47 which are joined by flanges 48 and 49 which are held together by bolts 50. The movable partition within the solution tank is preferably made in the form of a canvas bag 51 which is made slightly larger than one-half of the solution tank, in order that the bag may not be submitted to undue strains during operation. At its open end, the bag 51 is provided with a flange 52 preferably also of canvas, which is adapted to extend between the flanges 48 and 49 and to serve as a gasket between them.

The solution tank is preferably provided at each end at the top and bottom with threaded openings. With the arrangement shown in the drawing, the bottom openings are closed with plugs 54 and are used only for drainage purposes under abnormal circumstances, as when the apparatus is being repaired. It is through the upper openings in the solution tank that the treating solution and the impelling water are injected and removed, it being noted that these openings are on opposite sides of the movable partition formed by the bag 51 within the solution tank. One of the top openings in the solution tank is connected by a pipe 55 containing a valve 56 with the mixing tank 35; and this same opening is connected by a pipe 58 with the pipe 28 through which the treating solution is carried to the settling tank 15. For the purpose of furnishing a reliable means for controlling the flow of treating liquid, the pipe 58 is preferably provided with a constriction which may be constructed in the manner shown in detail in Figure 8. As shown, this constriction is introduced by means of a special nipple 60 having an end which is closed except for the fact that it is drilled as indicated at 61, this nipple being introduced between a pipe union 63 and a pipe T 64. For the purpose of permitting manual control of the flow of treating liquid through the pipes 58 and 28, and for the purpose of permitting the special nipple 60 to be removed and changed for another having a different size of constricted opening, valves 67 and 68 are preferably provided in the pipe 58 on each side of the constriction. As shown in the drawing, the pipe 58 is of considerably smaller gauge than the pipe 28, and these pipes are joined in a well-known manner thru a union 70 interposed between nipples 71, and a reducer 72.

The other opening at the top of the solution tank is connected, by a pipe 75 containing a valve 76, with the pipe 27 which leads to the source of supply in advance of the constriction introduced by the perforated plate 22, as hereinbefore described. This opening at the top of the solution tank is also connected through the pipe 75 to a drainage pipe 78 containing a valve 79 and leading to any suitable drainage point such as a drain 81 located in the floor of the building 34.

The preferred mode of operation of the apparatus hereinbefore described is as follows:

The treating material, such as soda ash, is placed in the wire basket 39 and is allowed to dissolve in water with which the mixing vat 35 may be filled by the opening of valve 45. Having thus prepared the treating solution in the mixing vat 35, and assuming that the left end of the solution tank is empty of treating solution, the treating solution may be introduced into the solution tank by opening the valve 56. While the solution tank is filling, the valve 76 in the pipe 75 should be closed, and the valve 79 in the drainage pipe 78 should be open; and if the settling tank 15 is so located that the water level in it is higher than the level of the treating solution in the vat 35, then either the valve 67 or the valve 68 should be closed while the filling of the solution tank is taking place, in order that the solution may not be diluted by water flowing back from the tank 15 through the pipes 28 and 58. However, this temporary discontinuance of the furnishing of treating solution to the settling tank 15 is not a serious matter, since the filling of the solution tank is quickly accomplished. It will be understood that the treating solution, thus admitted to the solution tank from the mixing vat 35, forces the bag 51, which serves as a movable partition in said tank toward the right end of the solution tank as viewed in Figure 1; and that any air or water on the right side of said bag is forced out thru the drainage pipe 78. As soon as the solution tank is filled, a condition which is indicated by the cessation of the flow of water through the drainage pipe 78, the valves 56 and 79 are closed, and the valves 76 and 67 (or 68) are opened, thereby applying to the inside of the solution tank at its right end as viewed in Figure 1, water under the pressure existing in the pipe 27. Owing to the fact that the pipe 27 is connected to the main 9 in advance of the constriction introduced by the perforated disc 22, the pressure on the water fed to the solution tank on the right side of the movable partition therein will be substantially the pressure of the water in the main 9 between the valve 17 and the orifice 22. Since the pipes 13 and 28 discharge against the same pressure or head, there will always be substantially the same pressure differential tending to produce flow of solution as is acting to produce flow of water through orifice 22, and this will be sufficient to gradually move the partition 51 toward the left, thereby forcing the treating solution out of the left end of the solution tank and through the pipes 58 and 28 up into the settling tank 15. Of course, it is to be understood that the pipe 27 need not be connected to the main 9 but may be connected to any portion of the systems at which the pressure corresponds to the pressure in main 9. As the treating solution emerges from the nozzle 30 into the stream of water passing into the settling tank 15 thru the supply pipe 13, a thorough mixing of the water and the treating solution takes place with beneficial results. Of course, however, the solution might be injected into the stream of water while it is still passing thru the pipe 13, if this is considered more desirable or convenient. In this case also the pressure differential producing flow of solution will always be substantially the same as the pressure differential at opposite sides of the orifice 22 and will depend upon the rate of flow through the orifice. When the bag 51 has been forced toward the left end of the solution tank as far as possible, and practically all of the treating solution has thus been expelled from the solution tank, the latter is again filled from the mixing vat in the manner previously described.

It will be understood that the apparatus shown and described furnishes means for introducing into a settling tank or other suitable discharge receptacle or conduit a treating solution of definite strength in quantities substantially proportioned to the amount of fluid passing thru the supply pipe to the tank, as long as the valve 17 is open. It will be noted also that as valve 17 closes, water will gradually cease to flow through the pipe 27 and that the pressure in the pipe 9 between valve 17 and orifice 22, which is herein referred to as the supply pressure, gradually falls, diminishing the pressure differential acting to feed solution. When, finally, the valve 17 is completely closed there is no pressure differential acting to feed solution and the injection of the treating solution from the solution tank will cease until the valve 17 opens again. Moreover, owing to the fact that the pipes communicating with the inside of the solution tank are connected to the top of the latter, any air that may collect in the tank will readily escape from it.

While I have shown certain forms of apparatus in which my invention may be embodied, it is to be understood that such apparatus may be modified in many respects without departing from the spirit of the invention as defined in the appended claims.

What I claim is:

1. In fluid treating apparatus, a settling tank, a supply pipe containing a constriction thru which said settling tank is connected to a source of fluid supply, and means for introducing into said settling tank a treating solution of definite strength in quantities substantially proportioned to the amount of fluid passing from the source of supply to said settling tank, said means comprising a tank for the treating solution having a movable partition therein, a pipe connected to the supply pipe at a point in advance of the aforesaid constriction and leading to the solution tank on one side of the partition therein, and a pipe leading from the solution tank on the other side of the partition to the stream passing into the settling tank.

2. In fluid treating apparatus, a settling tank, a supply pipe containing a constriction thru which said settling tank is connected to a source of fluid supply, and means for introducing into said settling tank a treating solution of definite strength in quantities substantially proportioned to the amount of fluid passing from the source of supply to said settling tank, said means comprising a tank for the treating solution having a movable partition therein, a pipe connected to the supply pipe at a point in advance of the aforesaid constriction and leading to the solution tank on one side of the partition therein, and a pipe having a constriction therein leading from said solution tank on the other side of the partition to the stream passing into the settling tank.

3. In fluid treating apparatus, a supply pipe containing a constriction and leading to a source of fluid supply under pressure, a settling tank receiving the discharge from said pipe, and means for introducing into said settling tank a treating solution of definite strength in quantities substantially proportioned to the amount of fluid passing thru said supply pipe to said settling tank, said means comprising a mixing vat, a solution tank having a movable partition therein, a pipe provided with a valve leading from said mixing tank to said solution tank on one side of the partition, a pipe containing a valve leading from said solution tank on the last mentioned side of said partition to the stream passing into the settling tank, a pipe containing a valve leading from said supply pipe from a point in advance of the aforesaid constriction therein to said solution tank on the other side of the partition, and a drainage pipe containing a valve leading from said solution tank on the last mentioned side of the partition.

4. In fluid treating apparatus, a supply pipe containing a constriction and leading to a source of fluid supply under pressure, a settling tank receiving the discharge from said pipe, and means for introducing into said settling tank a treating solution of definite strength in quantities substantially proportioned to the amount of fluid passing thru said supply pipe to said settling tank, said means comprising a mixing vat, a solution tank having a movable partition therein, a pipe provided with a valve leading from said mixing tank to said solution tank on one side of the partition, a pipe having a constriction therein and containing a valve leading from said solution tank on the last mentioned side of said partition to the stream passing into the settling tank, a pipe containing a valve leading from said supply pipe from a point in advance of the aforesaid constriction therein to said solution tank on the other side of the partition, and a drainage pipe containing a valve leading from said solution tank on the last mentioned side of the partition.

5. For use in fluid treating apparatus, a solution tank in the form of two cylindrical portions each closed at one end and attached together at their open ends and arranged with their axes substantially horizontal, said tank being provided on its inside with a movable partition in the form of a bag adapted to be moved into either end of the tank and arranged with its mouth extending between the sections of said tank to form a gasket, each of said tank sections being provided with an opening near the top of the closed end.

6. In fluid treating apparatus the combination with means for continuously supplying fluid under pressure, of means for supplying treating solution of uniform strength, and means for utilizing the continuous pressure of the fluid supply to proportion the rate of supply of the treating solution to the rate of supply of the fluid to be treated.

7. In fluid treating apparatus the combination with means for continuously supplying fluid under pressure, of means for supplying treating solution of uniform strength, and means for utilizing the continuous pressure of the fluid supply to proportion the rate of supply of the treating solution to the rate of supply of the fluid to be treated, and for discontinuing the supply of treating solution when the supply of fluid to be treated is discontinued.

8. In fluid treating apparatus, means for proportionate feeding of treating material of constant strength, fluid flow controlled means for controlling the rate of operation of the first said means, and means actuated by the head of the treated fluid to control the period of operation of the first said means, whereby said treating material is fed in true proportion to the quantity of fluid treated.

9. In a fluid treating apparatus, in combination, a conduit for supplying fluid under pressure, means in said conduit for impeding the flow of fluid therein and thereby producing a pressure differential in the conduit dependent for its value upon the rate of flow of the fluid, means for supplying treating solution of uniform strength, and means for utilizing the pressure differential in the conduit to feed the treating solution in uniform proportion to the rate of supply of the fluid to be treated.

10. In a fluid treating system, in combination, means for transmitting under pressure the fluid to be treated, said means having a restriction therein for utilizing the flow of the fluid to cause the pressure beyond the restriction to be less than the pressure in advance thereof, means for supplying treating solution of uniform strength connected to deliver to the system beyond the restriction, and means for applying the pressure in advance of the restriction to the solution supplying means, whereby the solution is always fed to the system at a rate dependent upon the rate of flow of the fluid to be treated, and in uniform proportion thereto.

In testimony whereof I have affixed my signature to this specification.

WILLIAM A. POWNALL.